United States Patent [19]

Moribe et al.

[11] Patent Number: 5,657,176

[45] Date of Patent: Aug. 12, 1997

[54] METHOD AND APPARATUS FOR OPTIMIZING THE RECORDING AND REPRODUCING OF INFORMATION FROM MAGNETIC DISKS

[75] Inventors: Yoshihiro Moribe, Chigasaki; Tetsuji Kameoka, Odawara; Toshiaki Tsuyoshi, Kawasaki; Sumio Obata, Ashigarakami-gun, all of Japan

[73] Assignees: Hitachi, Ltd., Tokyo; Hitachi Computer Peripherals Co., Ltd., Odawara, both of Japan

[21] Appl. No.: 471,460

[22] Filed: Jun. 6, 1995

Related U.S. Application Data

[63] Continuation of Ser. No. 996,383, Dec. 23, 1992, Pat. No. 5,430,581.

[30] Foreign Application Priority Data

Dec. 26, 1991 [JP] Japan .................... 3-344359

[51] Int. Cl.$^6$ .................. G11B 5/09; G11B 27/36
[52] U.S. Cl. .................... 360/31; 360/48
[58] Field of Search .................. 360/48, 135, 72, 360/49, 75, 98, 99, 32, 31

[56] References Cited

U.S. PATENT DOCUMENTS

| | | | |
|---|---|---|---|
| 4,016,603 | 4/1977 | Ottesen | 360/135 |
| 4,799,112 | 1/1989 | Bremmer et al. | 360/31 |
| 4,999,720 | 3/1991 | Wilson et al. | 360/48 |
| 5,087,992 | 2/1992 | Dahandeh et al. | 360/51 |
| 5,245,595 | 9/1993 | Yasukawa | 360/32 |
| 5,258,876 | 11/1993 | Danner et al. | 360/45 |

*Primary Examiner*—Donald T. Hajec
*Assistant Examiner*—Thien Minh Le
*Attorney, Agent, or Firm*—Kenyon & Kenyon

[57] ABSTRACT

Increased memory capacity for a magnetic disk device is realized without degrading information error rate, by making the number of sectors at a given circumference of the disk variable in accordance with a radial direction of a disk. The number of sectors is made variable by deciding a predetermined information error rate from a ratio of reproduced signal output to noises of head, disk and amplifier at a maximum recording and reproducing frequency at a certain radial position along a disk.

3 Claims, 18 Drawing Sheets

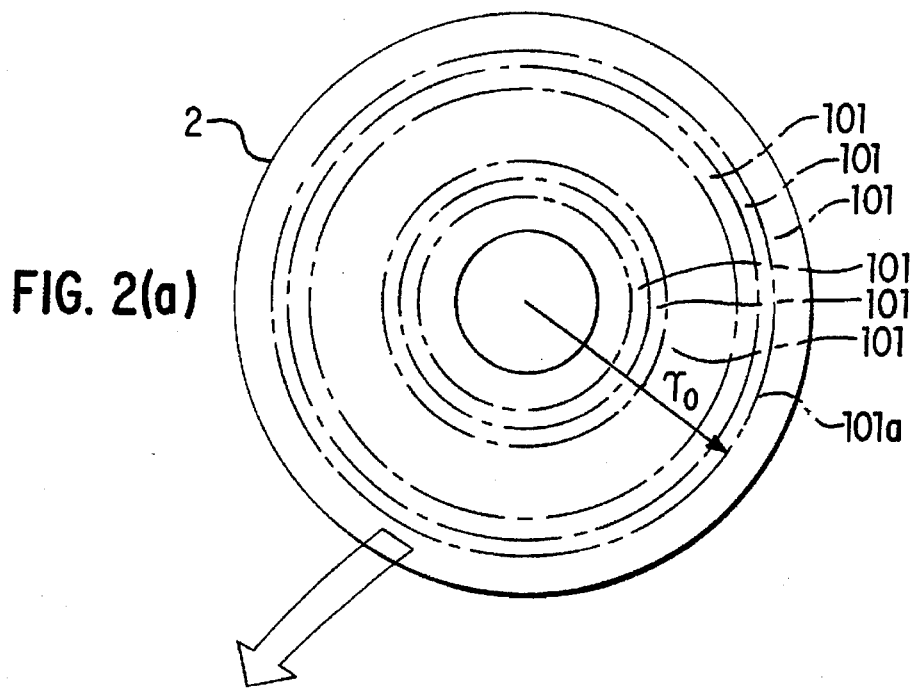
FIG. 2(a)
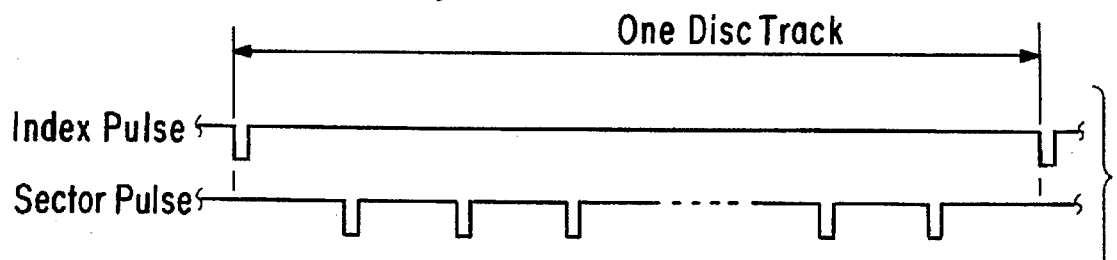
FIG. 2(b)
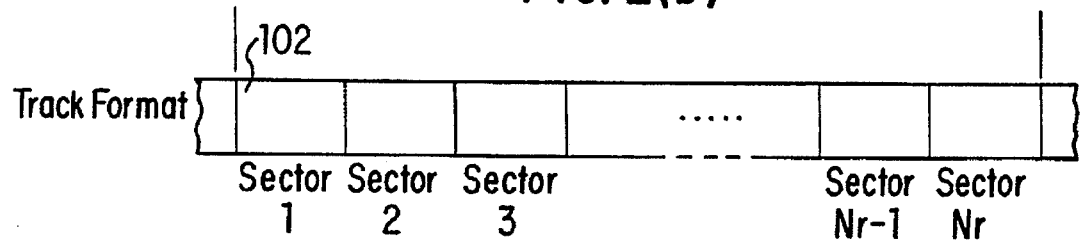
FIG. 2(c)
FIG. 3

| | CYLINDER NUMBER | | | | |
|---|---|---|---|---|---|
| | $0 \sim X_{a-1}$ | $X_a \sim X_{b-1}$ | ...... | $X_i \sim X_{m-1}$ | $X_m \sim X_{n-1}$ |
| LSI501 | $\alpha a$ | $\alpha b$ | ...... | $\alpha m$ | $\alpha n$ |
| LSI502 | $\beta a$ | $\beta b$ | ...... | $\beta m$ | $\beta n$ |
| LSI503 | $\gamma a$ | $\gamma b$ | ...... | $\gamma m$ | $\gamma n$ |
| READ/WRITE AMP — HEAD NUMBER 0 | Aa | Ab | ...... | Am | An |
| 1 | Ba | Bb | ...... | Bm | Bn |
| 2 | Ca | Cb | ...... | Cm | Cn |
| 3 | Da | Da | ...... | Dm | Dn |
| ⋮ | ⋮ | ⋮ | ⋮ | ⋮ | ⋮ |
| $Y_{n-3}$ | Pa | Pb | ...... | Pm | Pn |
| $Y_{n-2}$ | Qa | Qb | ...... | Qm | Qn |
| $Y_{n-1}$ | Ra | Rb | ...... | Rm | Rn |

INDEX

READ/WRITE AMP. 280 OUTPUT (411)

AGC AMP. OUTPUT (412)

A PORTION OF AGC. AMP. OUTPUT IN ENLARGED SCALE (412)

OUTPUTS OF INITIAL STAGE EQUALIZER (414) AND SUM AMP

OUTPUT OF REAR STAGE EQUALIZER

LOW-PASS FILTER OUTPUT

DIFFERENTIAL OUTPUT (415)

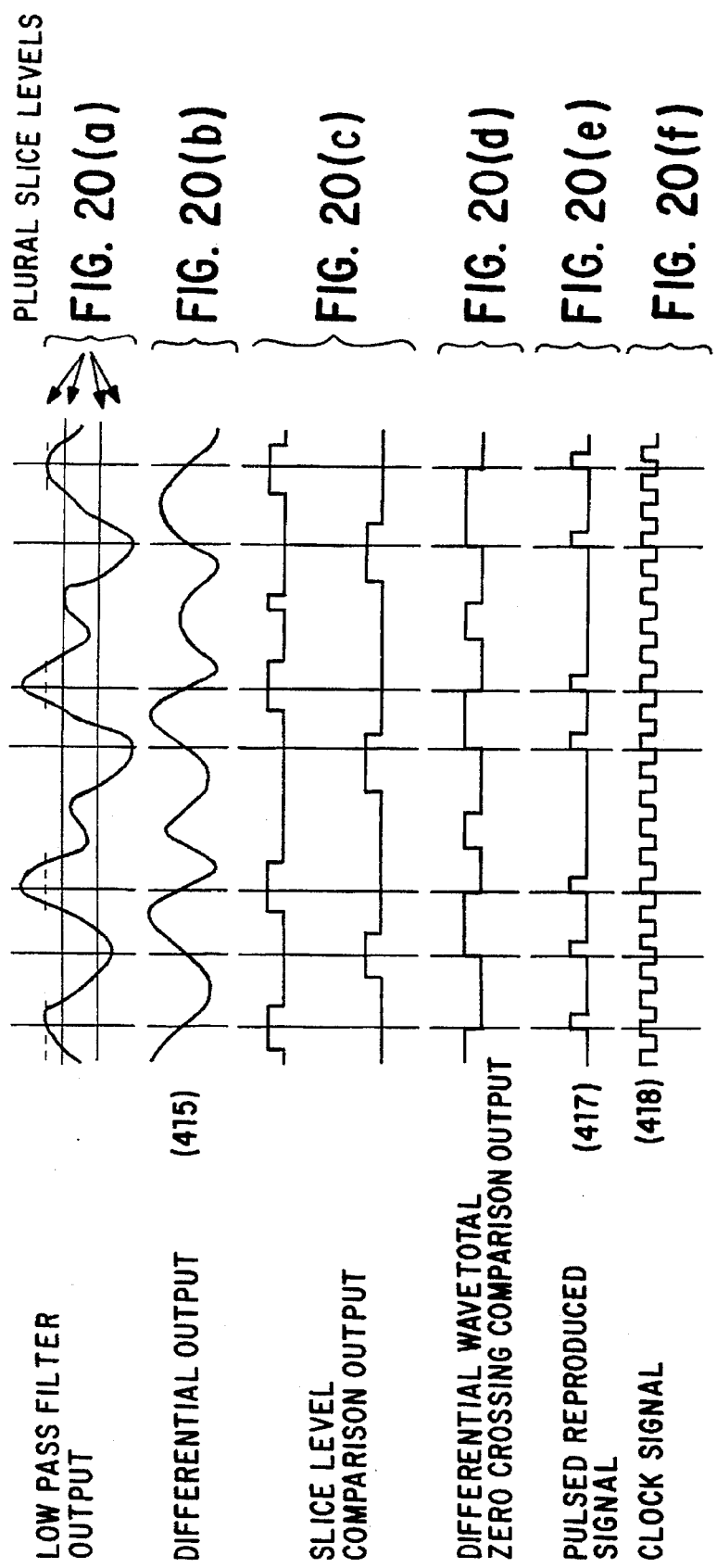

METHOD AND APPARATUS FOR OPTIMIZING THE RECORDING AND REPRODUCING OF INFORMATION FROM MAGNETIC DISKS

This application is a continuation of 07/996,383 filed on Dec. 23, 1992, now U.S. Pat. No. 5,430,581.

BACKGROUND ON THE INVENTION

1. Field of the Invention

The present invention relates to a randomly accessible magnetic disk device which can be an external memory device for a computer system and, particularly, to a method for making a number of sectors, the recording and reproducing units, on the disk variable in a radial direction of a disk and a device for performing the same method.

2. Related Art

It is known to provide a magnetic disk device, which is adapted to record and reproduce fixed length data. It is also known to provide a magnetic disk device capable of recording and reproducing variable length data.

In one such conventional magnetic disk device, the amount of data which can be recorded at a specific circumference of the disk defined by a specific radius, is constant across the radius of the disk. As a consequence a data recording density linearly decreases along the radius of the disk as the magnetic recording/reproducing head travels from the inner to the outer radii. In a magnetic disk device having such a recording density distribution in a fixed length data system, the number of sectors, the recording and reproducing units, is uniform along the radial direction of the disk.

Another such conventional device includes a magnetic disk device having a substantially constant recording density across the radius of the disk, or is only slightly reduced along the radius of the disk, as the magnetic recording/reproducing head travels from the inner to the outer radii. As a consequence, the memory capacity of such a device is increased as compared with the first conventional example. U.S. Pat. Nos. 4,799,112 and 4,894,734 each disclose examples of such conventional constant density devices.

The first conventional device has a draw back in that its memory capacity per device is smaller as compared with the second conventional device. However, while the second conventional device has merit in that memory capacity per device can be increased compared with the first conventional device, recording density in radially outward portion of the disk is still slightly lowered compared with that in radially inward portion of the disk as in U.S. Pat. No. 4,799,112 because a recording and reproducing margin in the radially outward portion of the disk is smaller compared with the first conventional example. This presents a different drawback namely that the recording and reproducing margin in radially middle portion of the disk is reduced. The conventional solution to this latter problem is to reduce the memory capacity of the device thereby at least partially nullifying the basic advantage of the second conventional device.

SUMMARY OF THE INVENTION

To overcome deficiencies in the conventional devices described above, the present invention provides a means for obtaining a maximum recording and reproducing frequency based in part on the number of sectors along the circumference defined by a certain radial position along a disk. The present invention further obtains a minimum radius of the disk capable of being recorded or reproduced with an error rate of recording and reproducing margin (error rate) that is lower than a certain fixed error rate based in part on a ratio of a reproduced signal output at the maximum recording and reproducing frequency to noise produced by the magnetic head, the disk and a reproducing amplifier. Further, according to the present invention the same means for obtaining a maximum recording and reproducing frequency performs these operations across the entire recording area of the disk (from the outermost track to the innermost track or from the innermost track to the outermost track). The result is a magnetic disk device in which at least two circumferences, defined by two different radii along the radial direction of the disk, have different numbers of sectors.

The present invention further includes means for making a signal to noise ratio substantially constant along the radial direction of the disk. The signal to noise ratio corresponds to ratio of the reproduced signal output, produced at the maximum recording and reproducing frequency at a magnetic head radial position in the innermost track of a group of tracks all of which have the same number of sectors, to the noise from the magnetic head, the disk and the reproducing amplifier.

The magnetic disk device of the present invention may include a recording and reproducing circuit that has means for indicating or selecting a recording and reproducing frequency in accordance with a radial position of the magnetic head with respect to the disk, means for optimizing a circuit characteristic in response to this frequency, and means for indicating proper recording current for each magnetic head. The means for selecting or indicating may include a microprocessor and may be controlled by a program of the microprocessor and by digital codes stored in a memory table. Further, the means for optimizing a circuit characteristic in response to the indicated or selected frequency includes means for making a low frequency amplitude of an analog reproduced waveform substantially constant; means for burying a pseudo-peak of the analog reproduced waveform; means for sharpening a peak of the analog reproduced waveform; means for filtering out or removing any frequency that is not lower than several times the recording and reproducing frequency of the analog reproduced waveform; means for differentiating the analog reproduced waveform through a plurality of slice levels of the analog reproduced waveform; means for detecting zero-crossings of the differentiated analog reproduced waveform and producing pulses in response to the detected zero crossings; means for separating the pulsed reproduced signal into a clock signal and a data signal; and means for demodulating the data signal.

With the above mentioned means, it is possible to make the recording and reproducing characteristics substantially constant in the radial direction of the disk and, further, since it is possible to make a value of information error rate not lower than the predetermined value, the present invention provides a magnetic disk device in which the number of sectors per track may vary along the radial direction of the disk.

BRIEF DESCRIPTION OF THE DRAWINGS

FIG. 2(a) illustrates coaxial recording tracks arranged on a magnetic disk that may be used in an embodiment of the present invention.

FIG. 2(b) illustrates index and sector pulses for the track of the magnetic disk of FIG. 2(a).

FIGS. 2(c) illustrate a track format for a track on the magnetic disk of FIG. 2(a).

FIG. 3 illustrates an example of a construction of a sector on a recording track of FIG. 2.

FIGS. 19(a) to 19(h) and 20(a) to 20(f) illustrate signals produced by elements of FIG. 15 during processing of a signal.

DETAILED DESCRIPTION

As shown in FIG. 2(a), a magnetic disk device has a magnetic recording medium constituted by a circular disk 2 which has a plurality of coaxial circular recording tracks 101. As shown in FIG. 2(c) each of the recording tracks 101 has a plurality Of sectors 102 (Sector 1 to Sector Nr), each sector constituting one recording and reproducing unit. As shown in FIG. 2(b) an index pulse is associated with each track and is produced at the beginning of each track. Furthermore, a separate sector pulse is associated with each sector of a given track.

FIG. 3 illustrates a format for a sector on a track. Each sector includes an identification area (ID) and a data area (Data). The ID Area permits a magnetic head to address a given sector while the Data area stores the information that is recorded and is to be reproduced. The Data area also stores an error correction code (ECC). Such codes are well known in the art. The sector also includes a servo signal.

Figure 10:
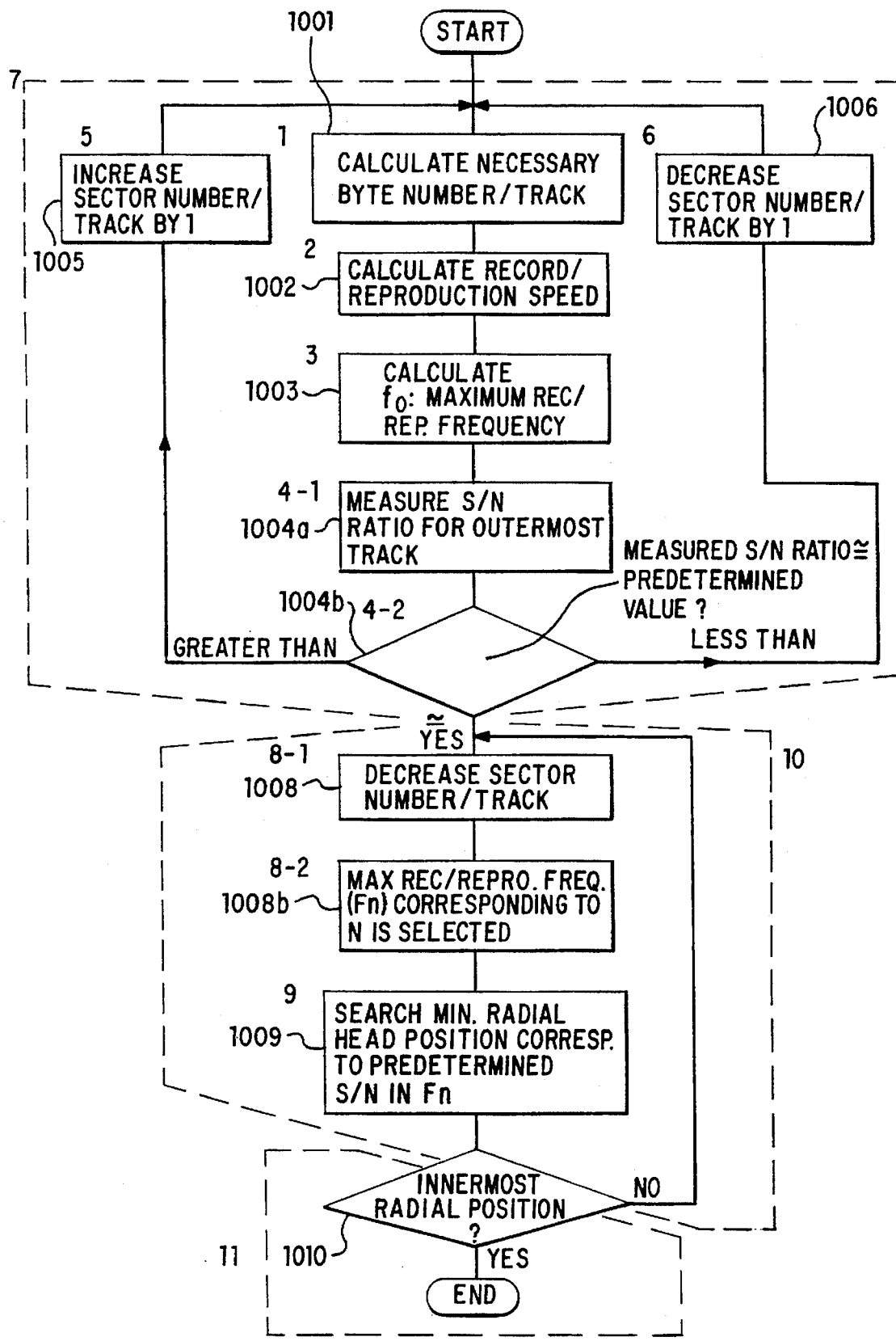
FIG. 10 is a flow chart indicating a design procedure in accordance with an embodiment the present invention for defining variable sector systems.

A design procedure of a system for making the number of sectors 102 on each track 101 variable will be described subsequently with reference to the flow chart illustrated in FIG. 10.

In general, an integer number of sectors 102 are arranged on each of the recording tracks 101. Therefore, the number of bytes necessary for one recording track can be obtained by determining the number of bytes that are necessary to constitute one sector 102, having a format as shown in FIG. 3. For example, when the required byte number for a sector 102 of a track is [Zr] (bytes) and the number of sectors along the track 101 at a given radial position is [Nr], the total number [Sr] of bytes required for the recording track 101 becomes $$Sr = Zr \times Nr \text{(bytes)} \tag{1}$$

After determining the total number of bytes necessary for a recording track, the recording and reproducing speed can be determined by using a rate of rotation of the disk 2. For example, assuming that the rate of rotation of the disk is M revolutions per minute (rpm), according to step 1002 the recording and reproducing speed [Qr] becomes $$Qr = (Zr \times Nr) \times M \text{(bytes/min)} \tag{2}$$

or $$Qr = (Zr \times Nr/60) \times M \text{(bytes/sec)}$$

$$Qr = (8Zr \times Nr/60) \times M \text{(bit/sec)} \tag{3}$$

assuming 8 bits per byte.

Once the recording and reproducing speed is determined, it is possible to calculate the maximum recording and reproducing frequency for actually recording and reproducing information in the given recording track 101 of the disk depending upon the coding system selected for recording and reproduction for the disk 2. This is step 1003. For example, in 1–7 Run Length Limited Code (RLLC), the maximum recording and reproducing frequency [Fr1] becomes $$Fr1 = [(8Zr \times Nr/60) \times M] \times (3/2/2) \text{ (Hz)} \tag{4}$$

and, in 2–7 RLLC, the maximum recording and reproducing frequency [Fr2] becomes $$FR2 = [(8Zr \times Nr/60) \times M](2/3) \text{ (Hz)} \tag{5}$$

The maximum recording and reproducing frequency [Fr1 or Fr2] is a recording and reproducing frequency with which a minimum magnetization inversion gap is provided on the disk or which is obtained from the minimum magnetization inversion gap in accordance with a certain coding system.

Since it is desired that the magnetic disk device can record as much information as possible in a limited number of disks, it is necessary to make the recording area density as high as possible. Therefore, it becomes important to know the upper limit of the recording density for a disk. A method for determining such an upper limit will now be described.

First, a track density or recording density of the disk 2 in a radial direction, is assumed as a certain value based on positioning accuracy of the magnetic head 5 of the magnetic disk device relative to the disk 2 in the radial direction. The recording line density or recording density on a track of the desired disk 2, is determined from the byte number [S] associated with a given radius position on the recording track 101 according to the above mentioned method. Under these conditions, it is necessary to determine whether or not information can be recorded or reproduced with an error rate that does not exceed a certain threshold error rate. This determination may be easily understood with reference to FIGS. 18(a) to 18(c).

Figure 18A:
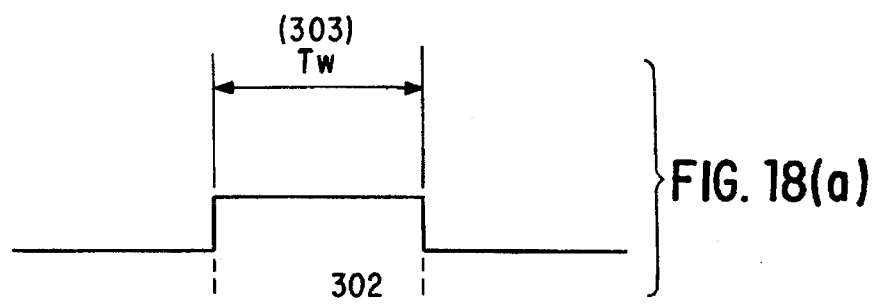
FIG. 18(a) to 18(c) illustrate a data discriminating window and factors for phase deviation of reproduced waveform and peaks.
Figure 18B:
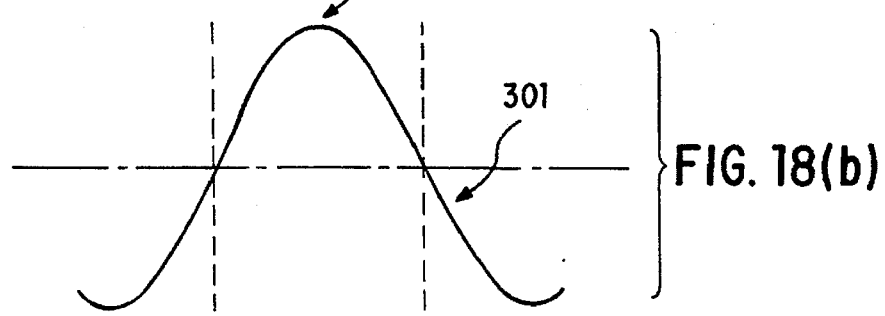
Figure 18C:
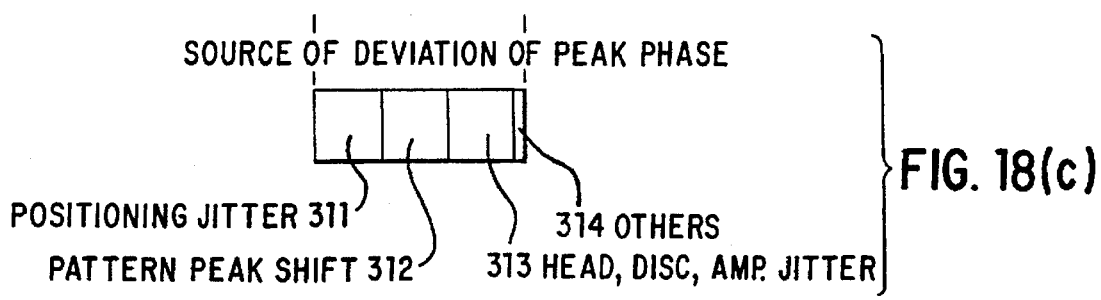
Figure 19A:
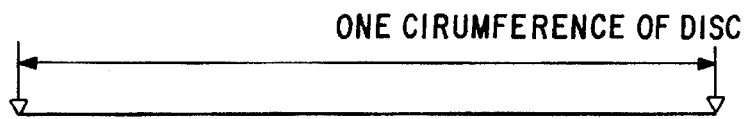
Figure 19B:
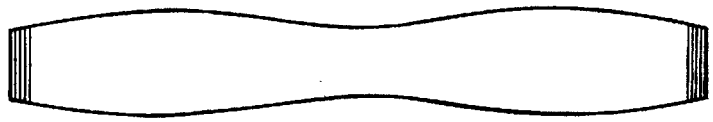
Figure 19C:
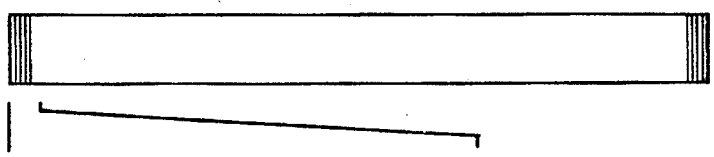
Figure 19D:
Figure 19E:
Figure 19F:
Figure 19G:
Figure 19H:
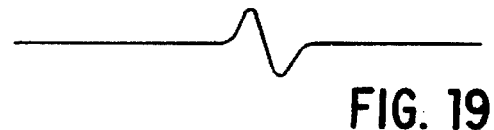

In order to enable recording and reproducing of information, it is necessary that a peak of a reproduced waveform 301 in FIG. 18(b), for example, peak 302, is within an information discrimination width (Tw) 303 in FIG. 18(a). Deviation of the reproduced waveform peak 302 with respect to the discrimination width (Tw) 303 can be the result of a number of electromagnetic conversion characteristics of the disk 2 and the magnetic head 5. However, as indicated in FIG. 18(c) the following three items are the primary reasons for such a deviation. First, there is a positioning noise jitter (Tjpe) 311 caused by positioning error due to the previously assumed positioning accuracy of the magnetic head 5. Second, there is a pattern peak shift (Tp) 312 due to linear recording density and interference from adjacent bits caused by minimum magnetization inversion gap and maximum magnetization inversion gap given to the disk 2 by the selected coding scheme. Further, there is a random noise jitter (Tjn) 313 caused by various noises (disk noise, head noise, amplifier noise, etc.) produced during signal reproduction. Among these three primary causes of peak deviation, positioning noise jitter (Tjpe) and the pattern peak shift (Tp) 312 can be calculated or actually measured for an assumed recording area density value. Therefore, to record and reproduce information, the following must be established for the discrimination width (Tw) 303:

$$Tw > Tjpe + Tp + Tjn + Tjr \quad (6)$$

where Tjr is that peak deviation due to jitter other than that corresponding to the three primary causes of deviation. Examples of such alternative sources of jitter include that caused by overlay characteristics or uncertainty of the discrimination circuit system, etc. When Tjpe, Tp and Tjr in the equation (6) are determined, the peak deviation tolerable for random noise jitter (Tjn) 313 is determined. Random noise jitter (Tjn) 313 has the following relation to reproduced signal to noise ratio (S/N).

$$Tjn = (1/\pi Fmax) \times arcsin(Npp/Spp) \quad (7)$$

where Spp is reproduced signal amplitude (peak to peak value) at the maximum recording and reproducing frequency and Npp is noise amplitude (peak to peak value). Since the noise amplitude Npp has a random value, it is usual that the Npp is determined by obtaining an effective noise value Nrms with a predetermined band width and then multiplying it by a certain constant $2_z$ that is determined by probability density function $\phi(Z)$ of normal distribution.

For example, if the probability is one information error per $1 \times 10^9$ bits, the probability equation is described as follows.

$$Npp = 12 \times Nrms \quad (9)$$

Therefore, when the necessary information error rate and tolerable random noise jitter (Tjn) 313 are determined from the equation (7), the required signal to noise ratio is obtained. As mentioned, since it is possible to estimate peak deviation due to random noise jitter (Tjn) 313 from the so-called S/N ratio, which is a ratio of the magnitude [Spp] of the reproduced signal to the magnitude [Nrms] of noise integrated within the necessary signal band, it is possible to say that the recording and reproducing of information is possible with an error rate smaller than a certain value if the measured S/N ratio is not less than a certain constant value. Thus, it is possible to determine whether or not the recording and reproducing characteristics are satisfactory. Although the required S/N ratio is determined by a balance of Tp and Tjpe, an error rate $1/(1 \times 10^9)$ can be satisfied, in general, when this S/N ratio (Spp/Nrms) is set to a value greater than or equal to about 32 db.

Therefore, when a disk 2 having certain magnetic characteristics and a magnetic head 5 having certain magnetic circuit characteristics are used in combination and the previously mentioned maximum recording and reproducing frequency is used at a position of the disk 2 corresponding to its radius [r(mm)] and the recording and reproducing characteristics are evaluated with reproduction output [S(mv)] and noise [Nrms (mv)] at the maximum recording and reproducing frequency, it is possible to determine whether or not the recording and reproducing characteristics at the radial position are satisfactory by comparing the reproduced output to noise ratio [S/N] to the threshold level of acceptability.

Since the efficiency of the magnetic disk device is improved with an increase of data to be recorded in the disk 2, the smaller the radius of the disk 2 which satisfies the reproduced output to noise ratio [S/N] at a certain maximum recording and reproducing frequency, the better the efficiency. Therefore, it is possible to determine the smallest radial position at which recording and reproducing is possible at the maximum recording and reproducing frequency by changing the radial position of the magnetic head 5 relative to the disk 2, that is, for example, by moving the magnetic head radially inwardly, and measuring the reproduced output to noise ratio [S/N] maintaining a certain maximum recording and reproducing frequency and comparing that ratio to the threshold ratio level that is acceptable.

Now, to record as much data as possible, procedures for finding how to change the number of sectors 102 in one recording track 101 with a change of the radial position of the recording track 101 of the disk 2 will be described with reference to FIG. 1 and steps 1004 to 1011 of FIG. 10.

According to step 1004a a maximum recording and reproducing frequency [fo] corresponding to a first (arbitrary) number [n] of sectors in the outermost track 101a at radius [ro] of the disk 2 is selected, and the previously mentioned [S/N] is measured at that operation frequency. The detected S/N value is compared to a certain predetermined value at step 1004b. When the measured [S/N] has enough of a margin with respect to the predetermined value, the number of the sectors to be assigned to the outermost track is incremented, the corresponding maximum recording and reproducing frequency is determined, and the signal to noise ratio is detected. The comparison to the predetermined S/N ratio is then performed again. This continues through sector numbers [n+1], [n+2], [n+3], [n+4], [n+5], successively as in step 1005. When the comparison of the measured [S/N] to the predetermined value yields an insufficient margin, the number of sectors to be assigned to the outermost track is decreased to in [n−1], [n−2], [n−3], [n−4], [n−5], successively as in step 1006.

This process determines the number [N] of sectors recordable and reproducible in the outermost track 101a that will have a signal to noise ratio that is closest to the predetermined value without exceeding it. The maximum recording and reproducing frequency [Fo] corresponding to this number of sectors [N] is then determined. This corresponds to point ao in FIG. 1.

Then, since the maximum recording and reproducing frequency at which the predetermined [S/N] is obtained becomes lower with inward radial movement, a maximum recording and reproducing frequency [F1] corresponding to the number [N–α] sectors is selected at step 1008b. (In this case, α is also a positive integer.) According to step 1009, a radial position on the disk 2 of the magnetic head 5 recordable and reproducible at this maximum recording and reproducing frequency [F1] is measured by measuring [S/N] while moving the magnetic head 5 radially of the disk 2 from a point a in the outermost track inwardly, and a radially position [r1] of the magnetic head with respect to the disk at which it is not less than a certain predetermined [S/N] is obtained. This corresponds to point b of FIG. 1.

The number of sectors is then reduced successively to [(N–α)–β], [(N–α–β)–γ], [N–α–β–γ)–δ], . . . , so as to determine radial positions of the magnetic head 5 with respect to the disk 2 at which recording and reproducing at maximum recording and reproducing frequencies [F2, F3, F4, . . . ] corresponding to the respective number of sectors, again by measuring [S/N] while moving the magnetic head 5 radially inwardly of the disk 2 successively. Radial positions [r2, r3, r4, . . . ] of the magnetic head 5 with respect to the disk at which the [S/N] are substantially minimum values that are not less than the certain predetermined S/N ratio value are obtained sequentially. These correspond to points c, d, e, . . . h, i, in FIG. 1. (In this case, β, γ, δ, . . . are also positive integers.) In reducing the number of sectors successively, it is preferable in view of design that α, β, γ, δ, . . . are each several % of a preceding sector number (at least not less than 3% and at most not larger than 15%) since there is substantial loss of memory capacity and works necessary to frequently change the sector number along the radius of the disk 2. That is, for example, in a case where it is reduced every 4% to 9%, it is enough to do as follows:

$$\beta = (N-\alpha) \times (0.04 \sim 0.09) \quad (6)$$

$$\gamma = (N-\beta) \times (0.04 \sim 0.09) \quad (7)$$

$$\delta = (N-\gamma) \times (0.04 \sim 0.09) \quad (8)$$

Figure 1:
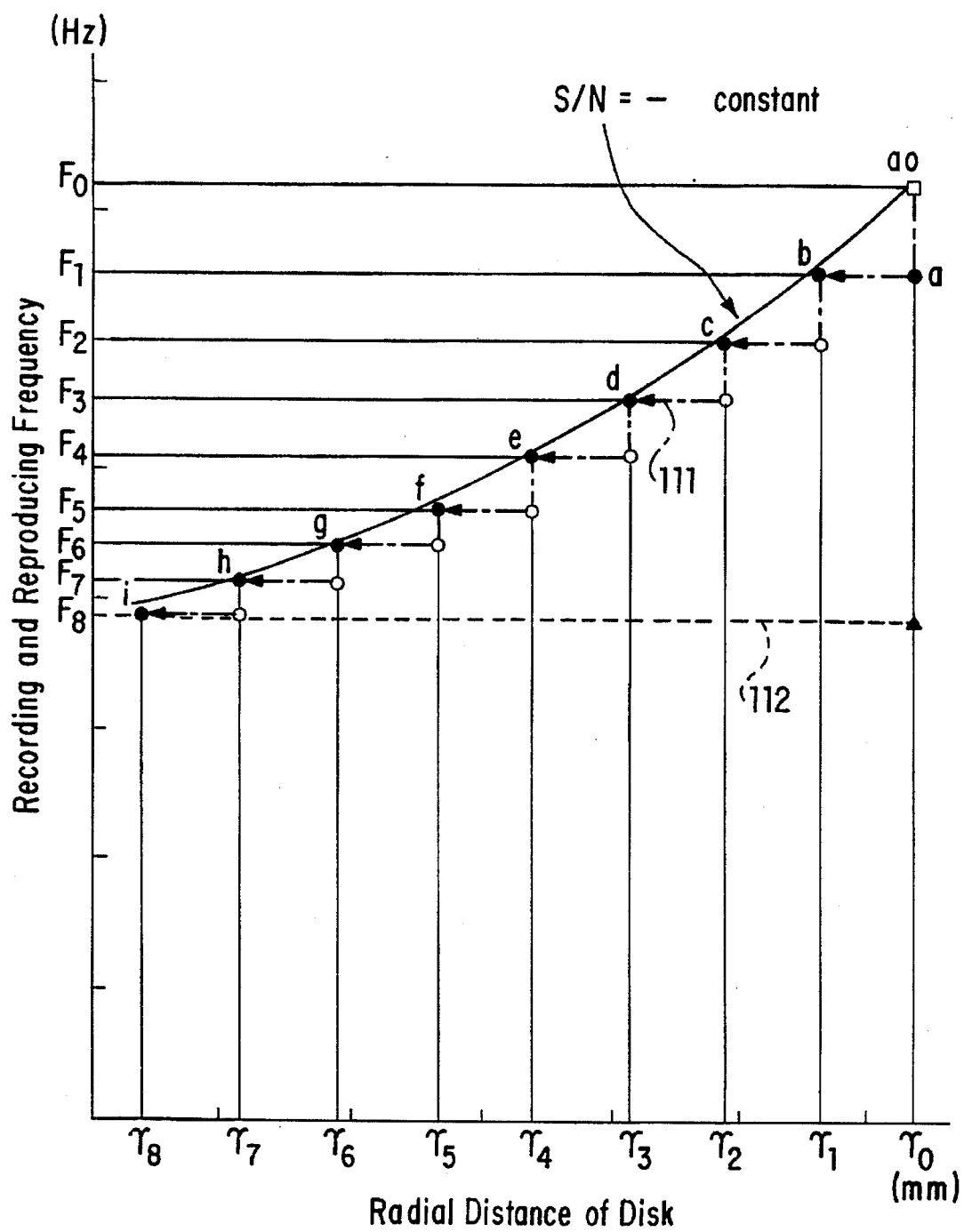
FIG. 1 illustrates a relationship between disk radius and a recording and reproducing frequency in accordance with an embodiment of the present invention.

When the radial position of the magnetic head 5 with respect to the disk 2 reaches the innermost track [r8] of the disk in this manner as detected in step 1011, the sector numbers at certain disk radial positions and maximum recording and reproducing frequencies corresponding thereto are determined as shown by chain lines 111 in FIG. 1. This figure shows the radial positions of the magnetic head 5 at which a larger amount of data can be recorded using this method for determining sector numbers compared with a system in which the number of sectors 102 on a recording track 101 is fixed radially along the disk 2. The maximum recording and reproducing frequencies corresponding to such a conventional device have a relationship between the magnetic head radial position and maximum recording and reproducing frequency as represented by a dotted straight line 112 in FIG. 1.

Of course, since typically there are a plurality of combinations of disks 2 and magnetic heads 5 in a single magnetic disk device and a mass production of magnetic disk devices is the premise, the certain predetermined [S/N] value may be set with a certain margin.

Figure 4:
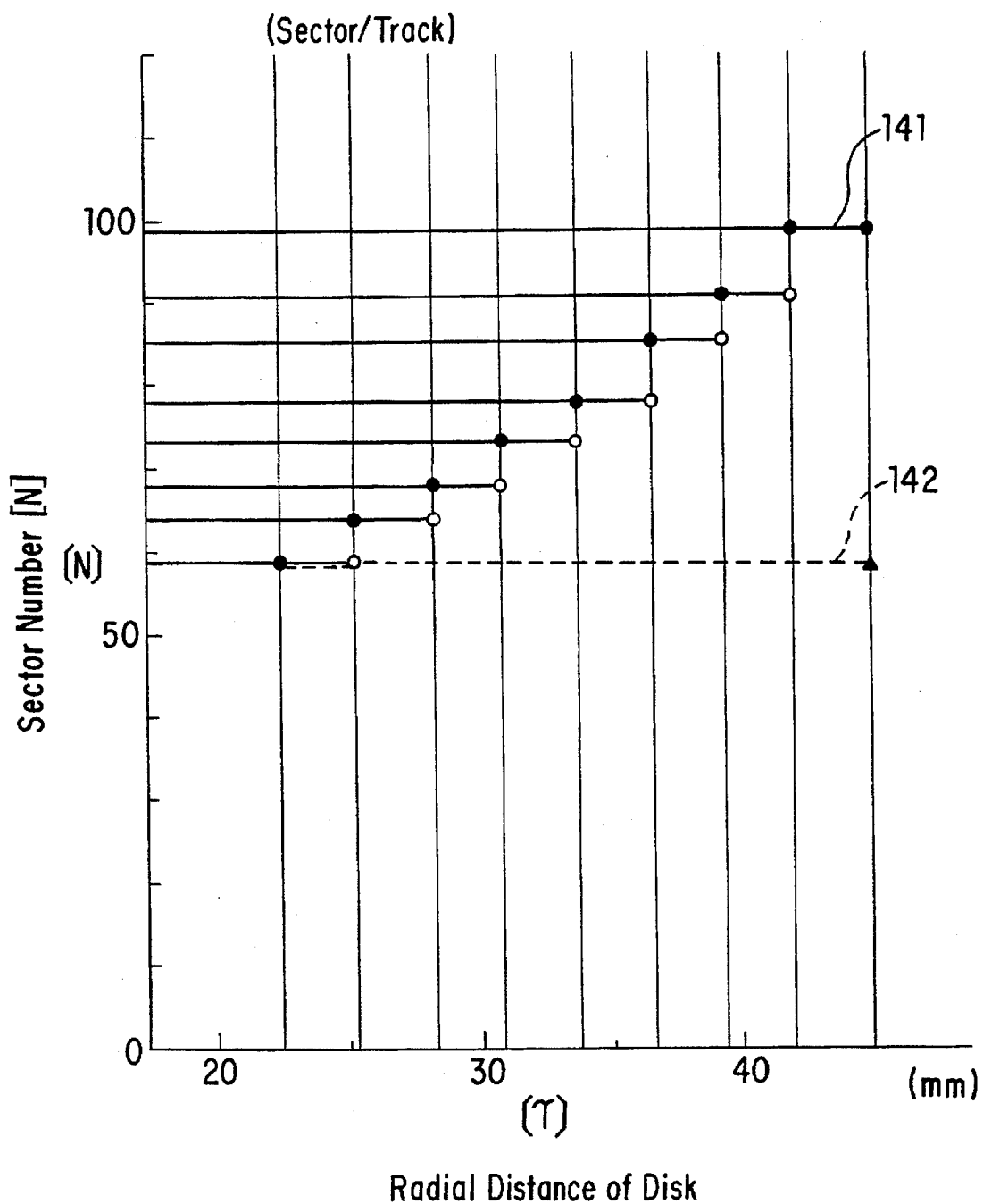
FIG. 4 illustrates a first example of changing the sector number per circumference along the radius of disk 2 in accordance with an embodiment of the present invention.
Figure 5:
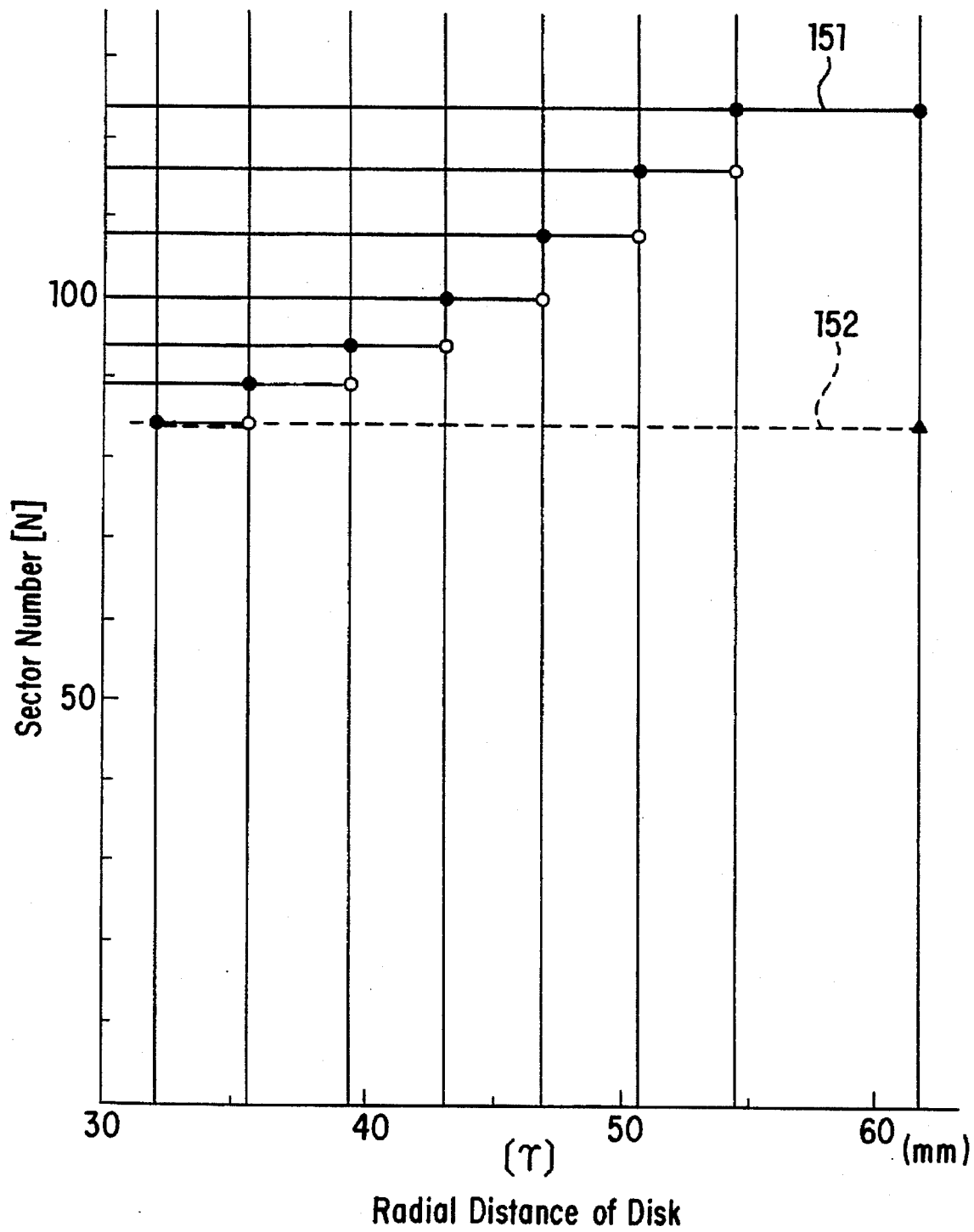
FIG. 5 illustrates a second example of changing the sector number per circumference along the radius of disk 2 in accordance with an embodiment of the present invention.

Stepped solid lines 141 and 151 in FIGS. 4 and 5 show a relationship of sector number to respective radial positions on a whole disk surface obtained in accordance with the present invention. These figures disclose an increase of the memory capacity by the amounts corresponding to the regions defined by the boundaries of straight dotted lines 142 and 152 and the stepped solid lines 141 and 151, respectively. The straight dotted lines 142 and 152 correspond to configurations in which the number of sectors per track is constant across the radius of the disk.

Figure 6:
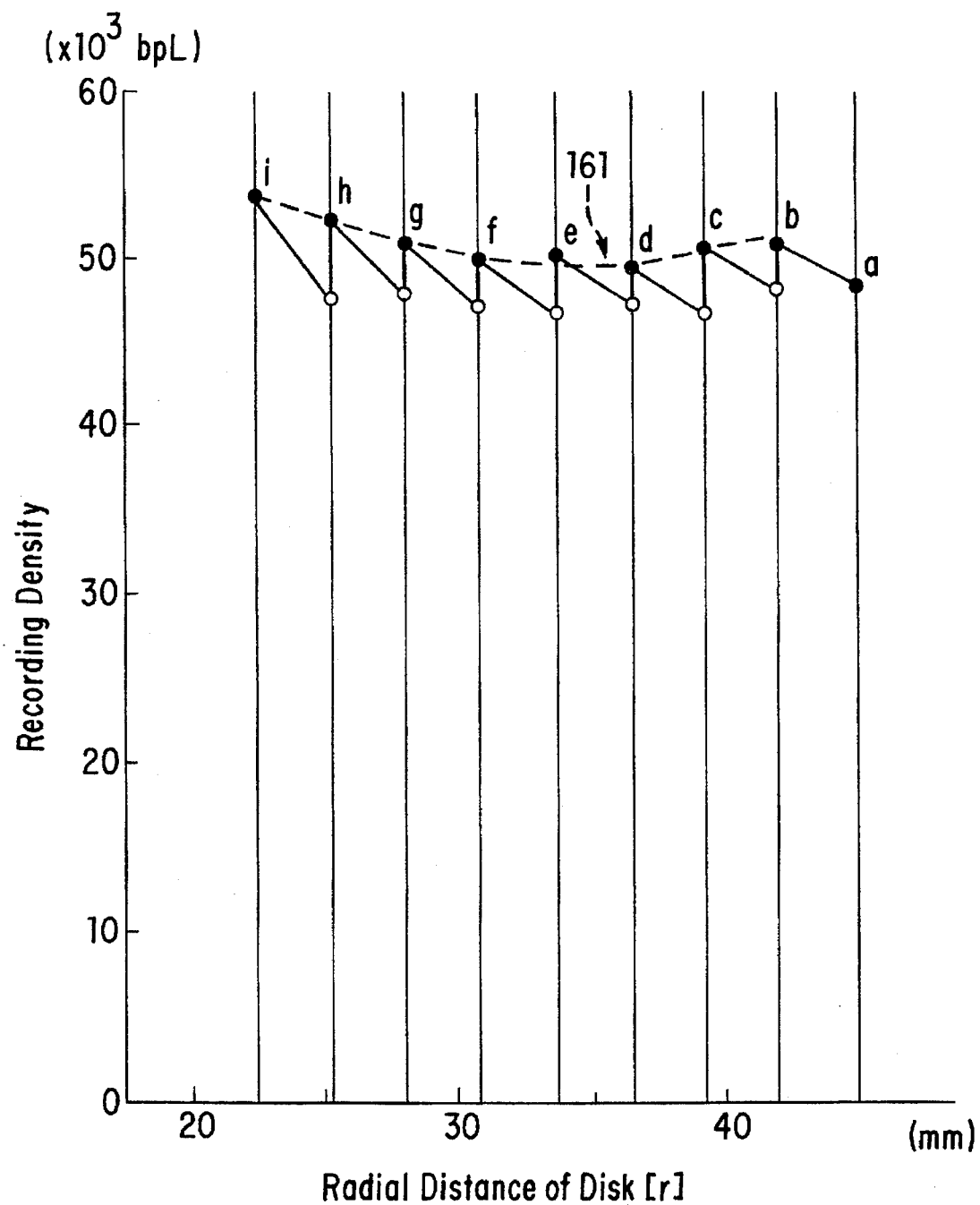
FIG. 6 illustrates a relationship of recording density to disk radius in accordance with the example of FIG. 4.
Figure 7:
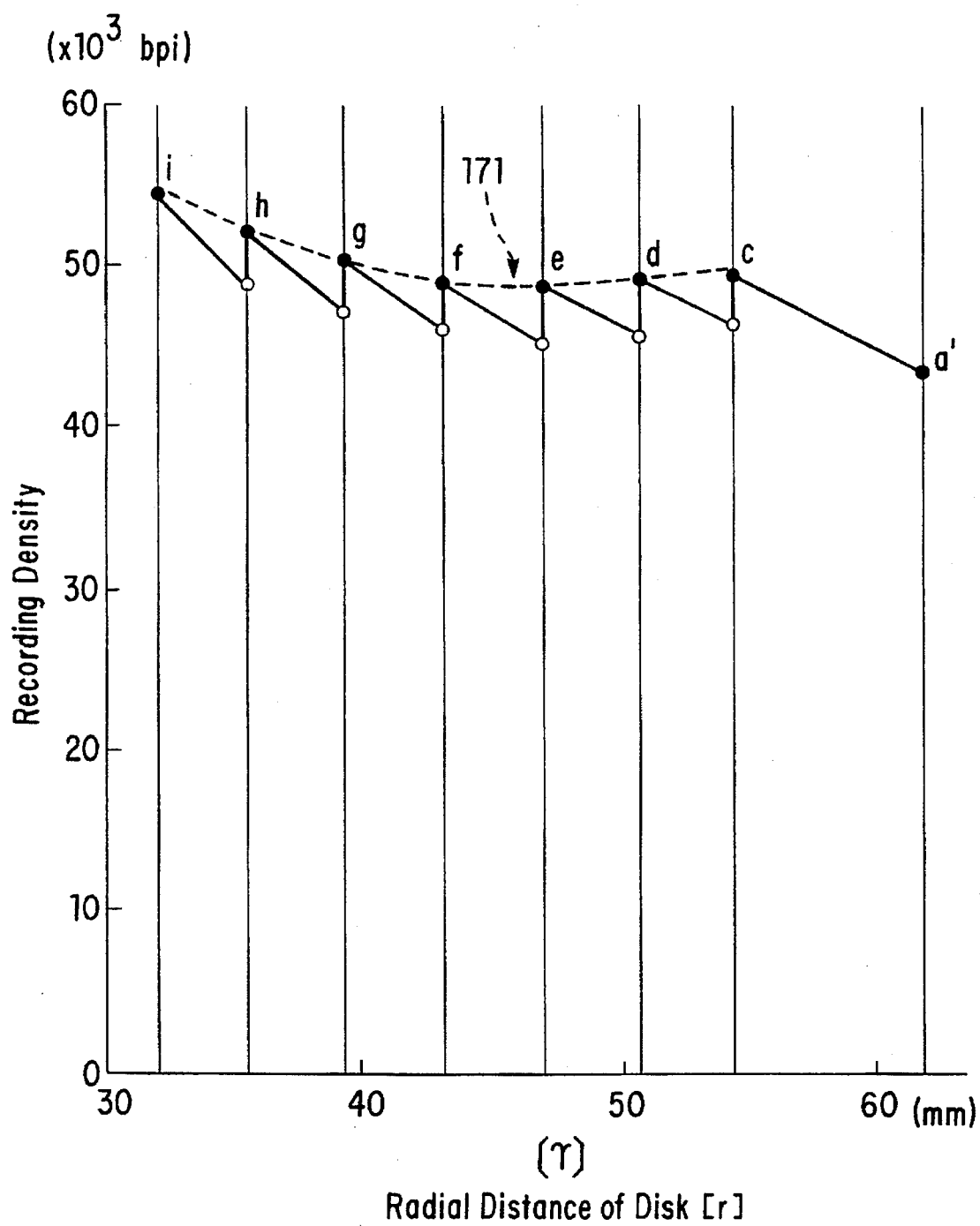
FIG. 7 illustrates a relationship of recording density to disk radius in accordance with the example of FIG. 5.

FIGS. 6 and 7 illustrate a relationship between a recording density and radial position of the magnetic head with respect to a disk that has the relationship between recording frequency and radial position of magnetic head with respect to a disk shown in FIGS. 4 and 5 respectively.

When the disk rotation rate is constant, the previously mentioned maximum recording and reproducing frequency is related to the recording and reproducing speed. If there is any restriction by which this recording and reproducing speed can not have a value more than a certain constant value, it may not be possible to either increase the number of sectors in outer tracks of a disk as in FIG. 5 and nor increase recording density in the outer tracks of a disk as in FIG. 7.

The recording density of a whole disk surface is obtained from the sector numbers at radial positions of the magnetic head 5 with respect to the whole surface of the disk 2. In FIGS. 6 and 7 the density is shown as a dotted line connecting maximum recording density sections (a, b, . . . , i) which are given by sectioning radial positions of the disk 2. There are eight sections in FIG. 6 and seven sections in FIG. 7.

The line is convex indicating that a recording density in a center portion of disk radius is set lower than the recording density in the radially inner and outer track portions of the disk. This dotted line connecting the maximum recording density points is an optimum curve. FIG. 4 of U.S. Pat. No. 4,799,112 also discloses a type of optimum curve, 11. However, the shapes of these two curves are substantially different from one another which is indicative of the differences between the present invention and that prior art.

The technical reasoning of this difference will be described in detail below.

Figure 8:
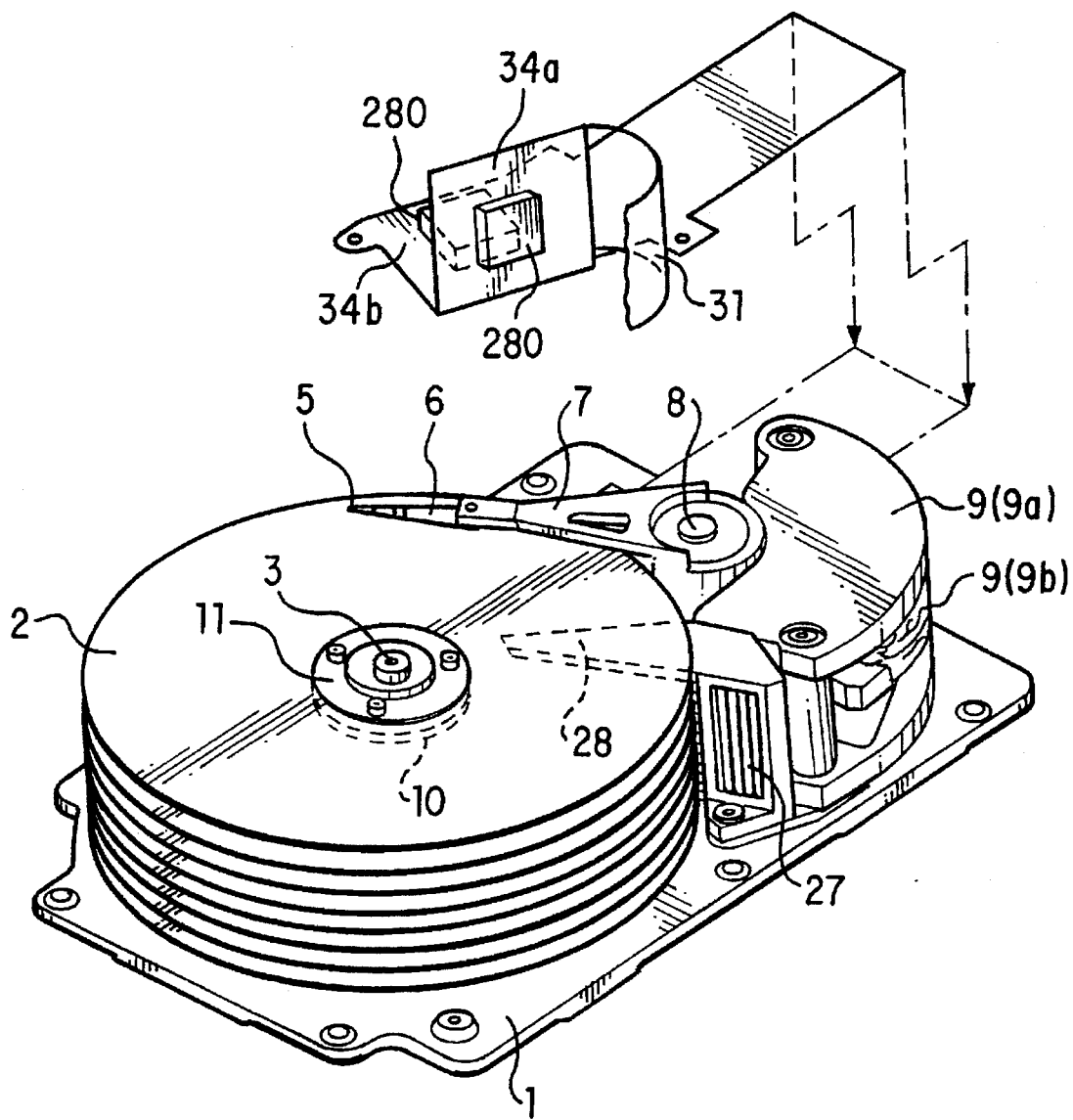
FIG. 8 illustrates a perspective view of a flat plate shaped housing on which are mounted the main constitutional parts of a head disk assembly in which an embodiment of the present invention may be employed.

FIG. 8 is a perspective view showing an internal structure of a mechanical portion of a magnetic disk device in which an embodiment of the present invention can be deployed. A spindle 3 rotatably supports a recording medium disk 2 in a plane parallel to a plane of a flat plate shaped housing 1. A motor (not shown) is housed within the spindle 3 for driving it. A magnetic head 5 for recording information on the disk 2 as residual magnetization and for reproducing that information is mounted on support spring 6 that floats the magnetic head 5 on the disk 2 with a minute gap. The support spring 6 is mounted to one end of a carriage 7. A pivot 8 rotatably supports the carriage 7. A voice coil motor 9 is provided positioning the magnetic head 5 along the radial direction of the disk 2. Additional elements within the flat plate housing 1 include a clamp 11 for fixing the disk 2 to the spindle 3 and, when a plurality of disks 2 are mounted on the spindle 3, spacers 10 are provided between adjacent ones of the disks 2. In such an instance a separate magnetic head 5 is provided for each of the opposite surfaces of the plurality of disks 2. A flexible printed substrate 31, for providing signal lines to and from the magnetic head 5 mounted on the carriage 7, is provided in the flat plate shaped housing 1. A read/write amplifier 280 for recording and reproducing information for the magnetic head 5 can be mounted on the flexible printed substrate 31 on reinforcing plates 34a and 34b for bending the flexible printed substrate 31 and fixing it in the housing. A servo amplifier (not shown) for positioning the magnetic head 5 mounted on the carriage 7 is also provided. Further, in the flat plate shaped housing 1, a circulation filter 27 filters dust in the housing. Also a spoiler 28 prevents the support spring 6 which supports the magnetic head 5 from vibrating by a flow of fluid (usually air) caused by rotation of the disk 2. In the illustrated embodiment the circulation filter 27 and the spoiler 28 are formed integrally.

Figure 9:
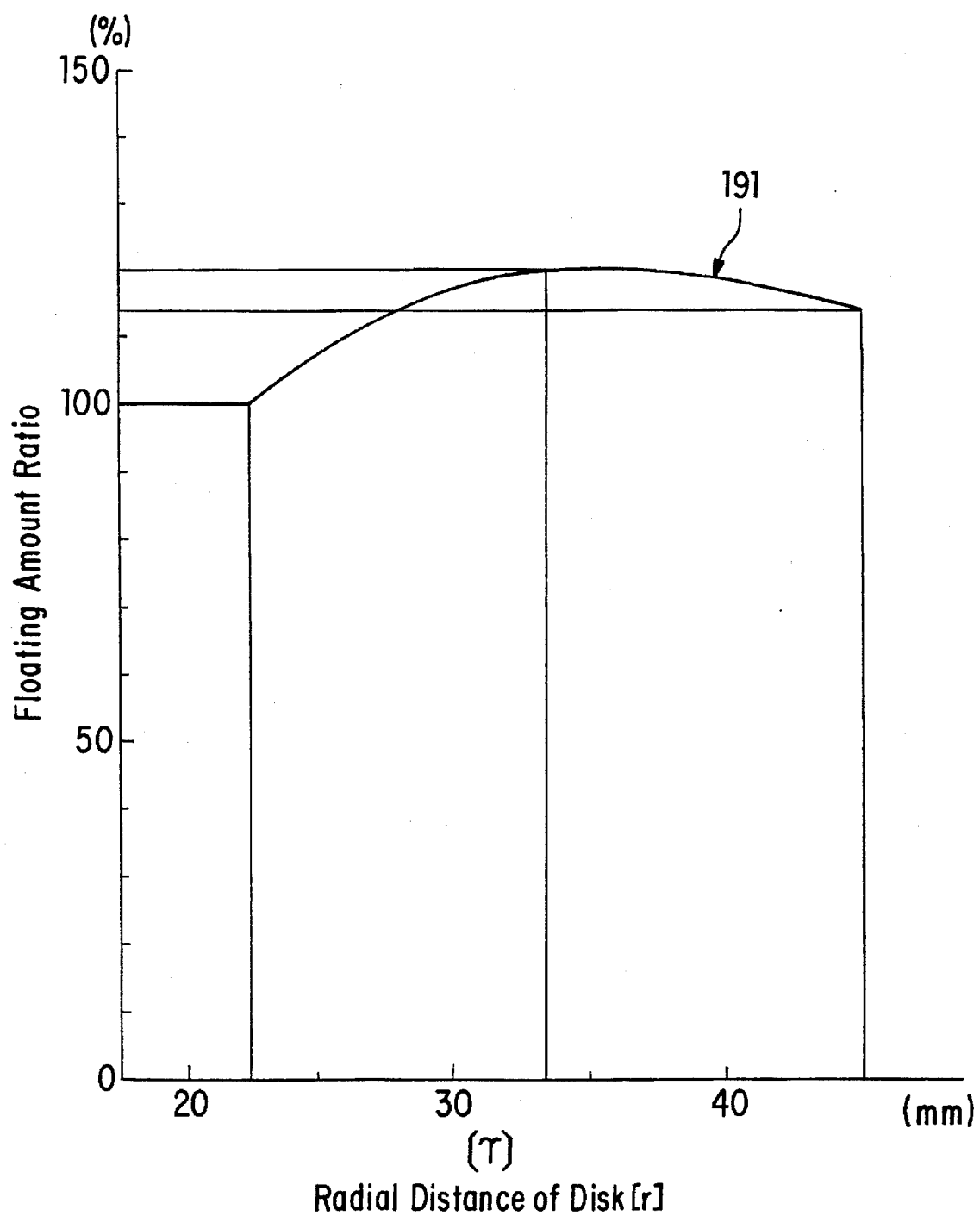
FIG. 9 illustrates a variation of a head floating ratio along a radial direction of the disk.

In a magnetic disk device in which a magnetic head 5 moves along an arc radially of a disk 2 as shown in FIG. 8, that is, in which a structure of a rotary type actuator is provided, an amount 191 of floating of the magnetic head 5 with respect to the disk 2 increases linearly up to a certain radial position of the disk 2 and, thereafter, it is reduced again along a curve, as shown in FIG. 9. This has an effect on the recording density along the radial direction of the disk, when the number of sectors at respective radial positions throughout the surface of the disk are changed such that the signal to noise ratio [S/N] does not become less than a certain value. This is because, in very high recording density situations, recording density for radial position of the disk 2 based on S/N measurements is affected more by the floating amount 191 of the magnetic head 5 rather than the magnetic characteristics of the disk 2 and the magnetic circuit characteristics of the magnetic head 5. Thus, in the inner and outer radial positions of the disk 2 in which the floating amount 191 of the magnetic head 5 is small, it is possible to record at higher density than that in the middle radial portion. Thus, the recording density corresponding to the respective ranges of number of the sectors becomes that shown in FIGS. 6 and 7. To improve the effective capacity of the device the floating amount 191 of the magnetic head 5 shown in FIG. 9 should be set such that the ratio of the maximum value to the minimum value thereof is at least not more than 135% and, preferably, not more than 120%. In such a case it is possible to provide an efficient variable sector magnetic disk device having large memory capacity.

A system in which the number of sectors on a recording track 101 is variable in a radial direction of the disk becomes possible by means of the design procedure of the present invention. FIG. 10, described above, shows a flowchart of this procedure.

A construction and an operation of a magnetic disk device using the present invention in which the number of sectors on one recording track 101 is variable in a radial direction of disk will now be described.

Figure 11:
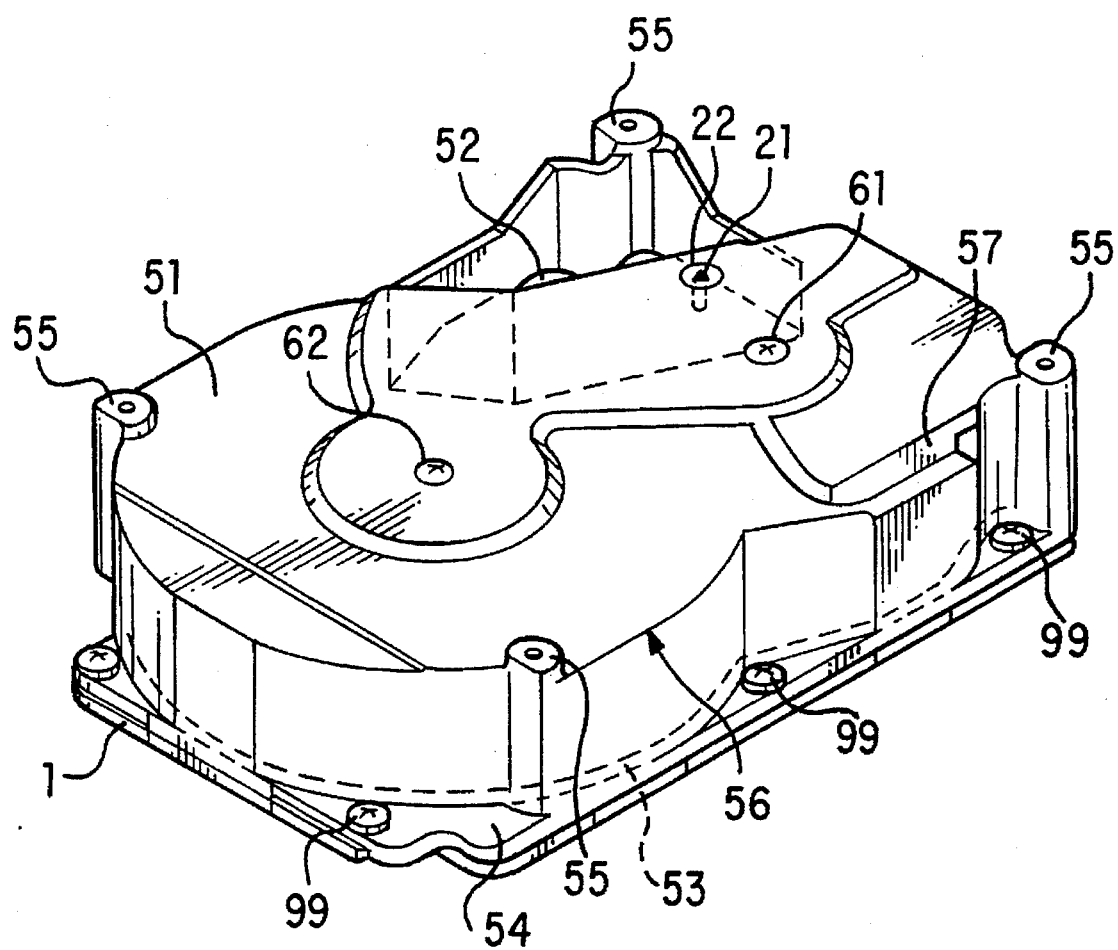
FIG. 11 illustrates a mechanical portion of a magnetic disk device, sealed by a cup shaped housing, in which the present invention may be employed.
Figure 12:
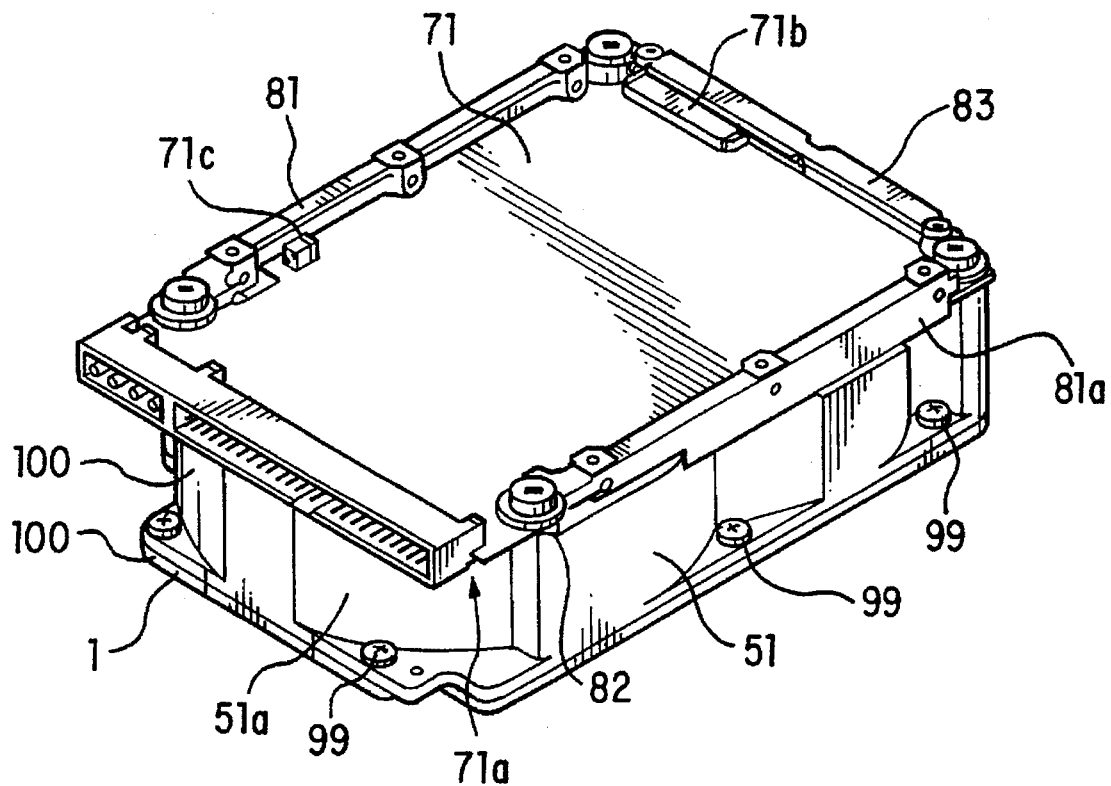
FIG. 12 illustrates a perspective view of a circuit substrate and a frame mounted on a head disk assembly.
Figure 13:
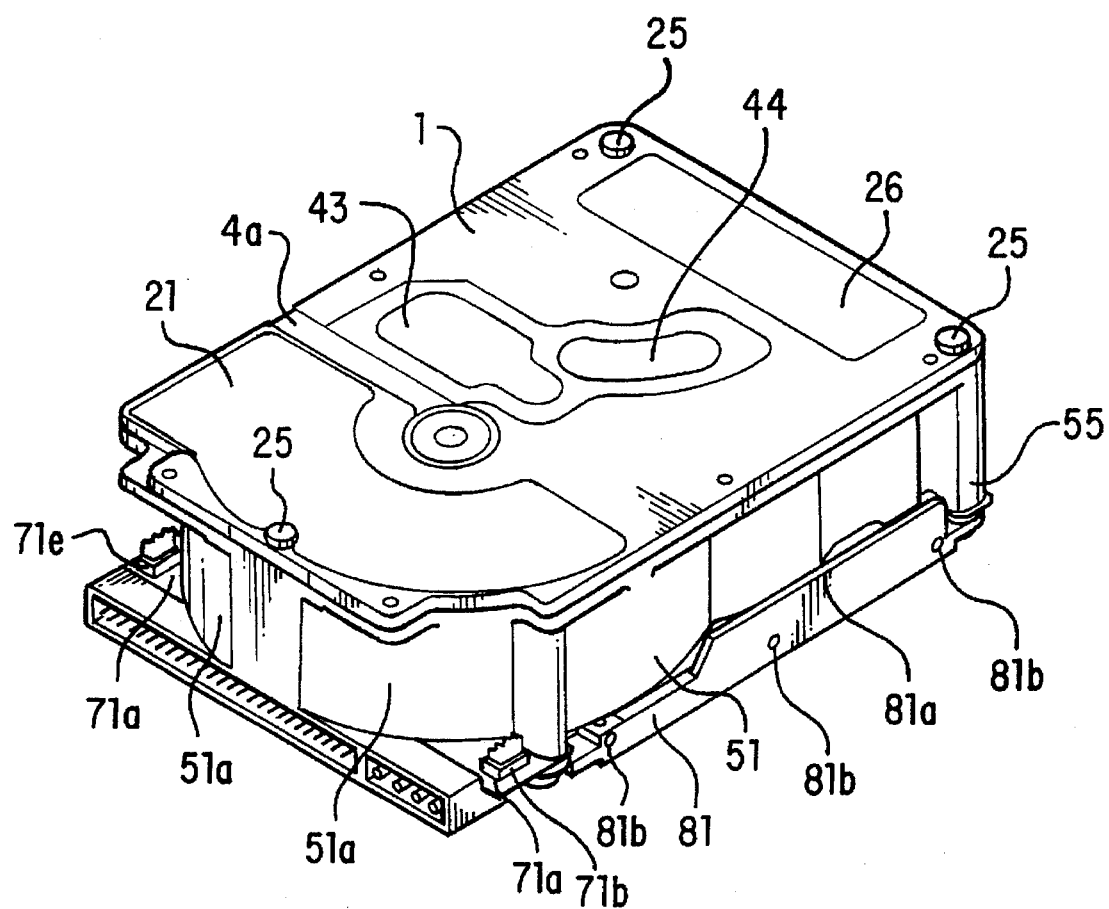
FIG. 13 illustrates a perspective view of an assembled magnetic disk device in which an embodiment of the present invention may be employed.
Figure 14:
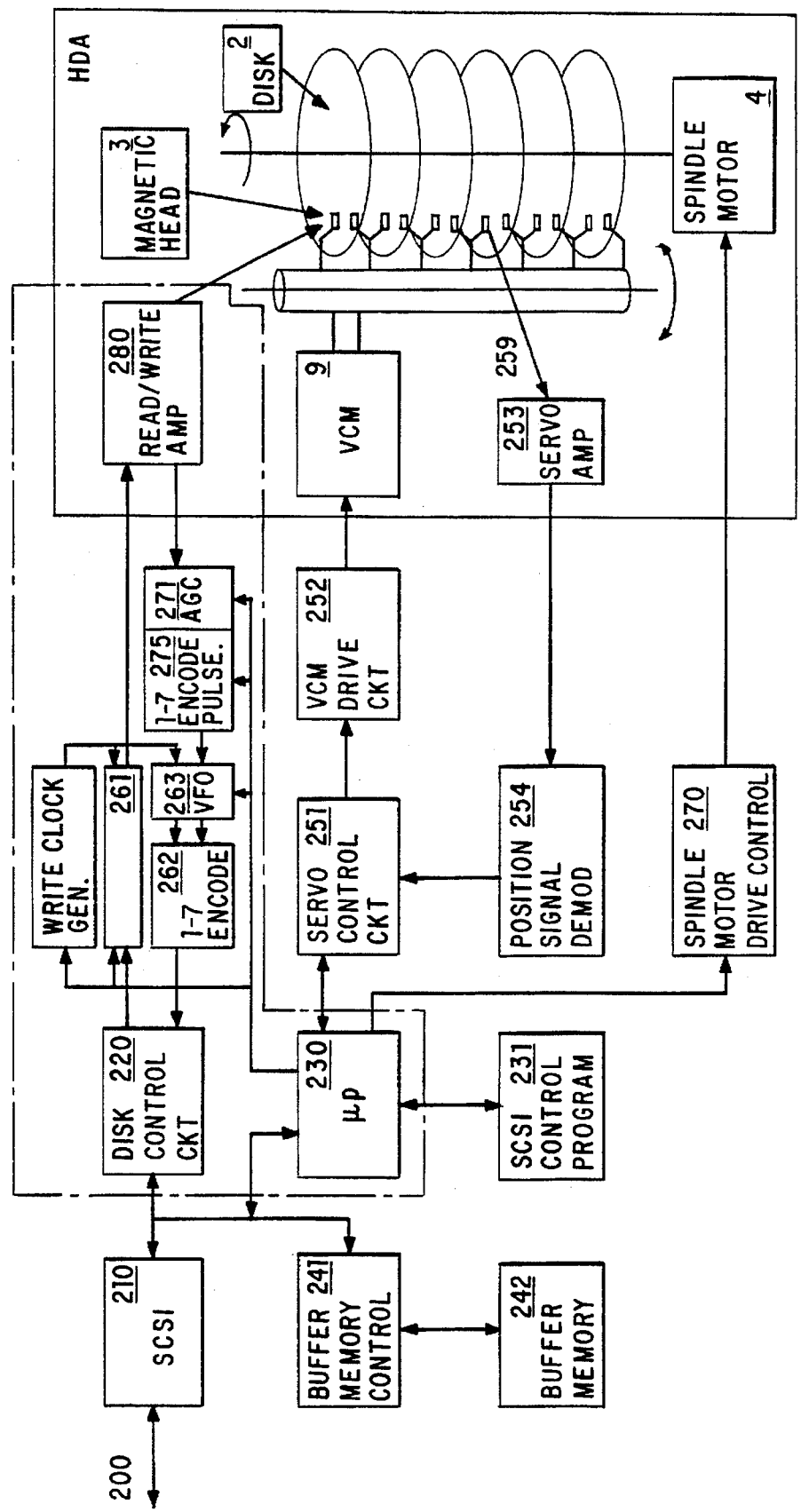
FIG. 14 is a block diagram of magnetic disk device in which an embodiment of the present invention can be employed.

FIGS. 12 and 13 are perspective views of outer configurations of a magnetic disk device in which an embodiment of the present invention may be employed. An electronic circuit may be mounted on a circuit substrate 71. The substrate 71 and a frame 81, together with an anti-vibration member 82 are mounted on the mechanism portion in which the disk 2 and the magnetic head 5 shown in FIG. 8, etc., are sealed in a cup shaped housing 51 shown in FIG. 11. When this magnetic disk device is incorporated in a computer system it is used with the circuit substrate 71 upside down, as shown in FIG. 13. The electronic circuit of this magnetic disk device is mainly mounted on the previously mentioned circuit substrate and FIG. 14 shows a construction of one such electronic circuit.

The construction and operation will be described next briefly with reference to FIG. 14.

When a power source is connected to the magnetic disk device, a microprocessor 230 supplies a start instruction to a spindle motor drive control circuit 270 to rotate the spindle motor 4 while checking while the microprocessor performs a checking operation on a main portion of the electronic circuit, for example, a buffer memory 242. When rotation of the disk 2 reaches the normal rotation speed and a read/write operation becomes possible, an indication of these conditions can be sent to an upper level system.

An instruction (a read instruction or a write instruction, etc.) from the upper level system is given through an SCSI interface 200 to an SCSI control circuit 210. The SCSI control circuit 210 analyzes this instruction and instructs a disk control circuit 220 designating a range to be read or written by addresses that include cylinder number, head number and sector number. Further, the SCSI control circuit instructs the microprocessor 230 to shift and position the magnetic head 5. In the mean time, for example, during execution of a write instruction, write data is stored in a buffer memory 242 through a buffer memory control circuit 241.

The microprocessor 230 causes a servo control circuit 251 to supply electric current from a VCM drive circuit 252 to the voice coil motor (VCM) 9 to shift the magnetic head 5 radially with respect to the disk 2. This shift is detected by a positioning signal 259 read out from the magnetic head 5. The positioning signal 259 is fed back to the servo control circuit 251 through a servo amplifier 253 and a positioning signal demodulation circuit 254, so that the magnetic head 5 is positioned to a target cylinder position precisely.

When the positioning of the magnetic head 5 is completed, the microprocessor 230 detects this condition and informs the disk control circuit 220 of a ready state for recording and/or reproducing operation. During the recording operation, the disk control circuit 220 responds to this ready state to output a control signal for a recording operation upon which a read/write amplifier 280 is activated through a 1–7 encoder 261 to thereby write data stored in the buffer memory 242 on to the disk 2 using the magnetic head 5. On the other hand, during a reproducing operation, the disk control circuit 220 responds to the ready state signal by providing a control signal for the reproducing operation in accordance with which a signal reproduced from the disk by magnetic head 5 is read data that is demodulated through the read/write amplifier 280 and automatic gain control (AGC) amplifier 271, a pulsation circuit 275 and a variable frequency oscillator (VFO) 263 and the 1–7 decoder 262. The microprocessor 230 stores the read data temporarily in the buffer memory 242 via the buffer memory control circuit 241. The read data are then transferred from the buffer memory 242 to the upper level system via the buffer memory control circuit 241, the SCSI control circuit 210 and the SCSI interface 200 on demand from the upper level system.

The operation described hereinbefore is managed by the microprocessor 230 and the SCSI control program 231 connected thereto.

Now, details of the operation when the present invention is applied thereto will be described with reference to FIG. 15 which shows in greater detail that portion of FIG. 14 which is encircled by a chain line.

Figure 15:
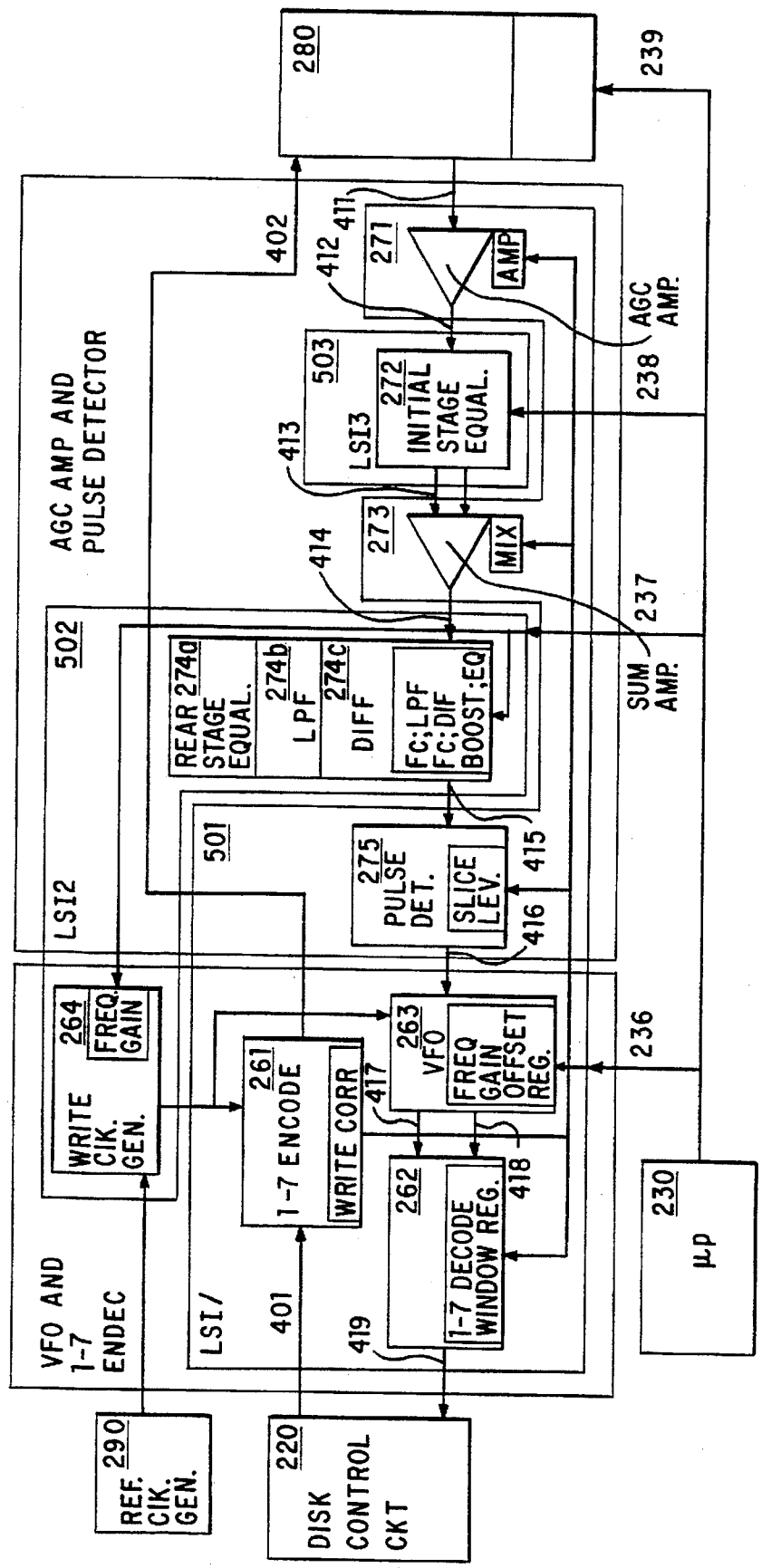
FIG. 15 illustrates a detailed block diagram of a recording and reproducing circuit portion of the magnetic disk device of FIG. 14.

As shown in FIG. 15, the recording and reproducing circuit is basically constituted by three large scale integrated circuits (LSIs). LSI 501 includes the 1–7 encoder 261, the 1–7 decoder 262, the VFO 263, the pulse detector 275, the SUM AMP 273 and the AGC amplifier 271. LSI 502 includes the write clock generator 264, a rear stage equalizer 274a and a low pass filter 274b and a differentiator 274c. LSI 503 includes an initial stage equalizer 272.

The flow of write data is shown by solid lines 401 and 402 which extend from the disk control circuit 220 through the 1–7 encoder 261 to the read/write amplifier 280. Further, the flow of read data is shown by solid lines 411–419 which extend from the read/write amplifier 280 through the AGC amplifier 271, the initial stage equalizer 272, the SUM AMP 273, the rear stage equalizer 274a, the low pass filter 274b, the differentiator 274c, the pulse detector 275, the VFO 263 to the 1–7 decoder 262.

Further, a reference clock generator 290 which generates a fixed frequency by means of a quartz oscillator, etc., is connected to the write clock generator 264.

Further, the microprocessor 230 is connected to the LSIs 501 to 503 and the read/write amplifier 280, respectively, and provides output signals 236–239 in the form of digital codes for controlling frequency characteristics of the internal circuits of the respective LSIs.

As mentioned previously, since this magnetic disk device is of the system in which the number of sectors 102 of the recording track 101 is variable along the radius of the disk 2, it is necessary to make the recording and reproducing frequency variable if the rotation speed of the disk 2 is constant. Further, the position of the magnetic head 5 along the radius of a disk, that is, the cylinder position, is managed by the microprocessor 230 as mentioned previously. Thus, the microprocessor 230 outputs the control signal 237 in the form of digital code to the write clock generator 264 according to respective cylinder positions and the write clock generator 264 converts the input frequency from the reference clock generator 290 into a signal having a frequency and gain that correspond to the cylinder position. The write clock generator in turn supplies this signal to the 1–7 decoder 262 and the VFO 263.

Figures 16, 17:
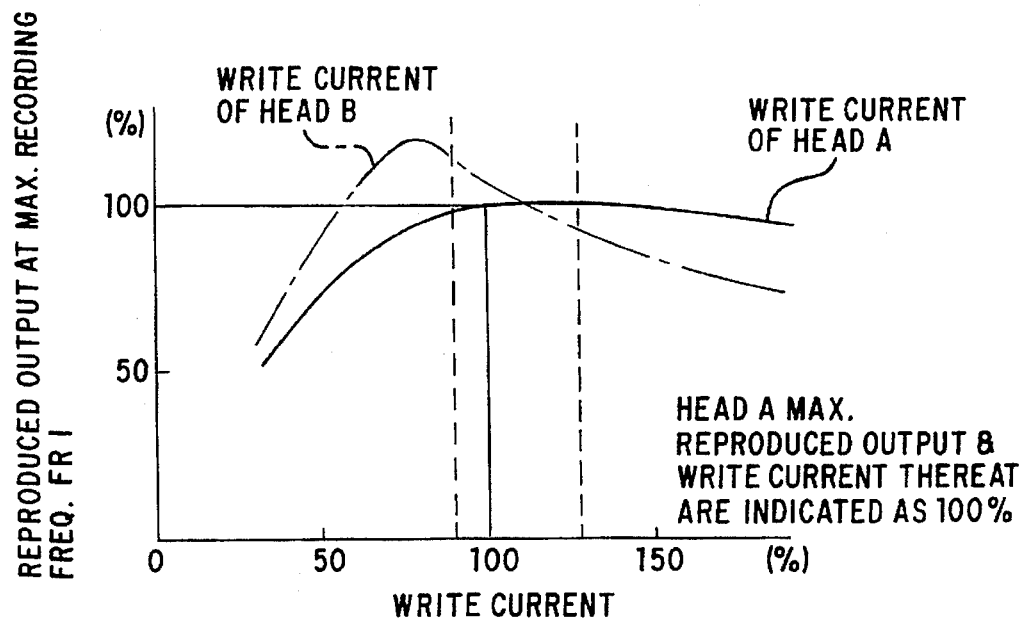
FIG. 16 illustrates saturation characteristics of a magnetic disk device.
FIG. 17 shows a table of digital control signals for a microcomputer which could be used in the magnetic disk devices of FIGS. 8, 13, 14 and 15.

During the recording operation, the 1–7 encoder 261 records and modulates the write data from the disk control circuit 220 with the recording and reproducing frequency provided in correspondence to the respective cylinder positions and supplies it to the read/write amplifier 280, as shown in FIG. 15. Further, the write current of the read/write amplifier 280 is controlled by a digital code control signal 239 from the microprocessor 230 and the recorded and modulated write data are written on the disk 2 via the magnetic head 5. In this case, the microprocessor 230 holds codes corresponding to optimum write current values of each magnetic head 5 in a table of the memory thereof as shown in FIG. 17 and therefore, different write current values may be indicated for different tracks in a single cylinder. The reason for this is to correct a recording current value to obtain the S/N value limit recordable or reproducible even if the optimum recording current value is changed as shown in FIG. 16 according to respective combinations of the magnetic head 5 and the disk 2 when the maximum recording frequency is increased to record and reproduce as many sectors as possible, as mentioned previously.

On the other hand, during a reproducing operation, the analog reproduction signal from the magnetic head 5 is preamplified by the read/write amplifier 280, amplified to a constant amplitude by the AGC amplifier 271, wave-shaped by the initial stage equalizer 272, the SUM AMP 273, the rear stage equalizer 274a and the low pass filter 274b and converted into a digital waveform by the differentiator 274c and the pulse detector 275. This digital waveform is divided by the VFO 263 into a clock signal 417 and a data signal 418 which are supplied to the 1–7 decoder 262. At this time, the microprocessor 230 provides output control signals 236–238 in the form of digital codes to the AGC amplifier 271, the initial stage equalizer 272, the SUM AMP 273, the rear stage equalizer 274a, the low pass filter 274b, the differentiator 274c, the pulse detector 275, the VFO 263 and the 1–7 decoder 262 in accordance with the respective cylinder positions to change the respective frequency characteristics thereof in correspondence to the reproduced signal frequency.

FIGS. 19 (a)–(h) and 20 (a)–(f) show features of the reproduced waveform processed in the respective circuit blocks. In this case, a means for optimizing circuit characteristics of the reproducing circuit correspondingly to the reproduced signal frequency in accordance with the radial position of the magnetic head with respect to the disk is constituted by the AGC amplifier 271 including means for making a low frequency amplitude of the analog reproduced signal waveform substantially constant (FIG. 19(c)), the initial stage equalizer 272 including means for burying pseudo-peak of the analog reproduced waveform (FIGS. 19(d) & 19(e)), the SUM AMP 273, the rear stage equalizer 274a including means for sharpening peaks of the analog reproduced waveform (FIGS. 19(f)), the low pass filter 274b including means for removing high frequency components of the analog reproduced waveform which are not less than several times the recording and reproducing frequency (FIGS. 19(g) and 20 (a)), the differentiator 274c including means for differentiating the analog reproduced waveform, the pulse detector 274 including means for producing pulses from the differentiated analog reproduced waveform by detecting zero crossings of slice levels thereof (FIGS. 20(a), 20(d) and 20(e)), the VFO 263 including means for discriminating the pulsed reproduced signal to the clock signal and the data signal and the 1–7 decoder 262 including means for demodulating the data signal thus discriminated.

Also in the reproducing operation, the output of the write clock generator 264 which is the fixed frequency of the reference clock generator 290 frequency-converted in accordance with the cylinder position is supplied to the VFO 263. This is to stabilize the operation of the VFO 263 in accordance with the cylinder position even when there is no reproduced signal input from the magnetic head 5.

The above mentioned control signals in the form of digital codes supplied from the microprocessor 230 to the LSIs 501–503 and the read/write amplifier 280 can be selected such that substantially optimum characteristics are obtained when the previously mentioned sector number microprocessor 230 in the form of a table as shown in FIG. 17.

In that figure each cylinder corresponds to a number of tracks, the same tracks on each of the plurality of disks. Thus cylinder "a" consists of tracks $0-X_a-1$, cylinder "b" consists of tracks $X_a-X_{(b-1)}$ etc. The microprocessor supplies a separate digital code to each LSI (501–503) for each cylinder. Thus when operating in cylinder "a" the microprocessor provides digital code αa to LSI501, βa to LSI502 and γa to LSI503. These codes have the general effect of setting the read/write operation to achieve the appropriate recording density consistent with the optimization method of the present invention. The specific effect of each code is described above.

Finally, the table also stores read/write current values for each magnetic head while it operates in a given cylinder. For example, in a system with n heads while the device operates in cylinder "a", the read/write current for head O is set by Aa, for head 1 by Ba, for head 2 by Ca etc. Thus, the device can compensate for the fact that each head/disk surface interface may have its own optimum read/write current.

Incidentally, the control signals for respective heads in the form of digital codes can have the same code for respective cylinder positions having an identical number of sectors, adjacent cylinder positions having different sector numbers or three or more cylinder positions having different sector numbers and the controls signals in the form of digital codes which are to be supplied to the LSIs 501–503 and the read/write amplifier 280 can have different codes for a certain cylinder position.

According to the present invention, a magnetic disk device having different sectors in radial direction of the disk can be provided since recording and reproducing characteristics thereof can be made substantially constant in radial direction of a disk and the information error rate can be maintained so that it does not fall below a predetermined value.

What is claimed is:

1. An information recording and reproducing apparatus comprising:

a rotary recording medium in a circular disk form and recording information, the rotary recording medium having a plurality of recording and reproducing units along a circumferential direction at an arbitrary radial position, said recording medium being characterized by a function defining a relationship between recording density and radial position having a characteristic line connecting density values obtained by dividing an information amount in the circumferential direction of said recording medium at each of a plurality of minimum radial positions of a plurality of at least two radial ranges by a length of a circular circumference of said recording medium at said respective minimum radial positions, said characteristic line having a downward convex shape with respect to radial position of said recording medium; and a means for selecting a number of recording and reproducing units by making a signal to noise ratio substantially constant along the radial direction of the disk.

2. An information recording and reproducing apparatus that comprising:

a rotary recording medium in a circular disk form and recording information, the rotary recording medium having a plurality of recording and reproducing units along a circumferential direction at an arbitrary radial position, said recording medium being characterized by a function defining a relationship between recording density and radial position having a characteristic line connecting density values obtained by dividing an information amount in the circumferential direction of said recording medium at each of a plurality of minimum radial positions of a plurality of at least two radial ranges by a length of a circular circumference of said recording medium at said respective minimum radial position, said characteristic line having a downward convex shape with respect to radial position of said recording medium;

a transducer adapted to record or reproduce the information on said recording medium;

a positioning mechanism adapted to position said transducer radially along said recording medium;

a position detector indicating a position of said transducer along the radius of said recording medium; and means for recording and reproducing the information by means of said transducer so that a number of recording and reproducing units are selected to make a signal to noise ratio is substantially constant along the radial direction of the disk.

3. An information recording and reproducing apparatus that comprising:

a rotary recording medium in a circular disk form and recording information, the rotary recording medium having a plurality of recording and reproducing units along a circumferential direction at an arbitrary radial position, said recording medium being characterized by a function defining a relationship between recording density and radial position having a characteristic line connecting density values obtained by dividing an information amount in the circumferential direction of said recording medium at each of a plurality of minimum radial positions of a plurality of at least two radial ranges by a length of a circular circumference of said recording medium at said respective minimum radial potions, said characteristic line having a downward convex shape with respect to radial position of said recording medium;

a transducer adapted to record or reproduce the information on said recording medium;

a positioning mechanism adapted to position said transducer radially along said recording medium;

a position detector indicating a position of said transducer along the radius of said recording medium; and means for recording and reproducing the information by means of said transducer according to an information recording and reproducing method comprising the steps of:

comparing a first voltage, reproduced by said transducer at a maximum recording and reproducing frequency determined in accordance with both the number of recording and reproducing units at the arbitrary radial position on said recording medium and an mount of information per recording and reproducing unit, with a second voltage having a value of non-signal components integrated with respect to frequency and to be given from said transducer to said recording and reproducing means;

moving said transducer radially along said recording medium until a comparison value obtained in said step of comparing becomes substantially equal to a value with which a certain predetermined information recording and reproducing error rate is obtainable;

determining the radial position of said transducer on said recording medium when this equality is determined, wherein the portion of the recording medium between said arbitrary radial position and said determined radial position comprising a first range in which recording and reproducing units remain constant;

moving said transducer to a second radial position outside said first range; and repeating said steps of comparing, moving and determining within a recording and reproducing area of said recording medium starting with said second radial rather than said arbitrary radial position, whereby said medium is partitioned into at least two ranges along a radial direction of said recording medium each having a different number of said recording and reproducing units.

* * * * *

UNITED STATES PATENT AND TRADEMARK OFFICE
CERTIFICATE OF CORRECTION

PATENT NO.   : 5,657,176
DATED        : August 12, 1997
INVENTOR(S)  : Yoshihiro Moribe, et al It is certified that error appears in the above-indentified patent and that said Letters Patent is hereby corrected as shown below:

Column 14, Line 34, change "mount" to --amount--

Signed and Sealed this

Twenty-third Day of June, 1998

BRUCE LEHMAN

*Attest:*

*Attesting Officer*            Commissioner of Patents and Trademarks